United States Patent

Canniff et al.

[11] Patent Number: 5,953,330
[45] Date of Patent: Sep. 14, 1999

[54] COMMUNICATION SWITCH

[75] Inventors: Ronald Jay Canniff; Thomas Lloyd Hiller, both of Naperville; Ronald Anthony Spanke; John Joseph Stanaway, Jr., both of Wheaton; Alex Lawrence Wierzbicki, Bollingbrook; Meyer Joseph Zola, Lisle, all of Ill.

[73] Assignee: Lucent Technologies Inc., Murray Hill, N.J.

[21] Appl. No.: 08/822,533

[22] Filed: Mar. 24, 1997

[51] Int. Cl.⁶ .................................................. H04L 12/66
[52] U.S. Cl. ........................ 370/352; 370/359; 370/375; 370/413; 370/376
[58] Field of Search .................................. 370/352, 360, 370/374, 373, 375, 376, 378, 389, 377, 395, 442, 458, 401, 907, 905, 397, 396, 383, 363, 329, 336, 341, 359, 379, 382, 399, 412, 413, 415, 417, 419

[56] References Cited

U.S. PATENT DOCUMENTS

| | | | |
|---|---|---|---|
| 4,521,880 | 6/1985 | Orsic | 370/376 |
| 4,545,053 | 10/1985 | Raamot | 370/376 |
| 4,566,094 | 1/1986 | Ardon et al. | 370/376 |
| 4,592,048 | 5/1986 | Beckner et al. | 370/354 |
| 5,144,819 | 9/1992 | Munter et al. | 370/60.1 |
| 5,305,312 | 4/1994 | Fornek et al. | 370/363 |
| 5,311,569 | 5/1994 | Brozovich et al. | 379/45 |
| 5,331,632 | 7/1994 | Aaron et al. | 370/376 |
| 5,347,512 | 9/1994 | Fechalos et al. | 370/384 |
| 5,369,633 | 11/1994 | Maruyama et al. | 370/376 |
| 5,412,657 | 5/1995 | Bottiglieri et al. | 370/376 |
| 5,452,297 | 9/1995 | Hiller et al. | 370/395 |
| 5,509,005 | 4/1996 | Nagamoto | 370/378 |
| 5,521,919 | 5/1996 | Anderson et al. | 370/376 |
| 5,539,729 | 7/1996 | Bodnar | 370/335 |
| 5,590,129 | 12/1996 | Ardon | 370/376 |
| 5,841,771 | 11/1998 | Irwin et al. | 370/360 |
| 5,841,848 | 11/1998 | Dunn | 379/138 |
| 5,848,053 | 12/1998 | Ardon | 370/376 |

*Primary Examiner*—Douglas W. Olms
*Assistant Examiner*—Phirin Sam

[57] ABSTRACT

An enhanced Time Slot Interchange (TSI) facility, in addition to serving synchronous channels of communication, decomposes and composes asynchronous data cells to provide real-time communication among and between both synchronous and asynchronous channels served by a network access switch. An asynchronous cell comprises a 5 byte header and a 48 byte payload. The payload comprises voice samples from a temporarily defined set of DS0 facilities and/or data from a variety of data facilities. Time slots of the TSI are temporarily assigned to the payload bytes of each incoming asynchronous cell; the payload bytes are stored in memory locations corresponding to those time slots; and the stored data is read out during time slots assigned to the destination channels of communication. The TSI comprises three data rams to accommodate for frame to frame jitter in the time of arrival of payload samples. Asynchronous cells are composed by transferring stored voice samples and data bytes to an asynchronous link during the times slots which are currently assigned to bytes of the composed cell payload. The header for outgoing asynchronous cells is inserted by a message handler.

9 Claims, 6 Drawing Sheets

COMMUNICATION SWITCH

TECHNICAL FIELD

This invention relates to switches for communicating between and among Asynchronous data facilities, e.g., Asynchronous Transmission Mode (ATM) facilities and synchronous facilities, e, T1 carrier, Sonet/NCT, facilities.

BACKGROUND OF THE INVENTION

There is strong interest is providing direct transmission on high capacity data transmission systems within and between all types of network switches. Switches for the purpose of this discussion being: switch modules of a larger switch; PBX's; stand alone end office switches and network access switches.

By way of example of such a need, the prior art toll network is composed of expensive toll switches which serve tandem calls and provide toll network access to end switches of the Public Switched Telephone Network (PSTN). As an alternative to such arrangements, U.S. Pat. No. 5,345,446 which issued on Sep. 6, 1994, proposes use of Asynchronous Transfer Mode (ATM) cells, or ATM-like cells, to communicate digitized voice and digital data signals between pairs of access switches of the PSTN. Such communication is provided by Permanent Virtual Circuits (PVC) through the network. Permanent Virtual Circuits are activated and deactivated as a function of the traffic between offices. The proposed ATM transmission standard packs data into independent cells of a time frame, e.g., a time frame of 125 μsec. The cells are transmitted serially without the presence of any framing signals; and the number of cells in any 125μ second period is dependent on the bandwidth of the ATM transmission facility. In the prior art example of U.S. Pat. No. 5,345,446, each cell is 53 bytes long and comprises a 5 byte header and a 48 byte payload. In the case of DSO 64 kilobits/second PCM signals, in the case of DSO channels, each byte of the 48 byte payload carries a sample signal of a different PCM channel. Higher rate PCM channels can be accommodated in such cells by assigning a number of bytes in a cell, e.g., by assigning 6 bytes in a cell to 384 kilobits/second channels. Similarly, lower rate PCM channels can be accommodated by transmitting their samples in alternate 125μ sec. periods. The five byte headers identify a particular Permanent Virtual Connection (PVC) in the network and indirectly define the assignment of the payload bytes to calls being served.

A problem faced in communicating ATM cells between communication network end points, e.g., between switch modules of a 5ESS® switch; and between end offices, are the tasks of composing and decomposing ATM cells to permit selective real-time transfer of payload data between ATM channel facilities and between an ATM channel and the various formatted synchronous PCM channels served by a network access switch. U.S. Pat. No. 5,345,446, demonstrates use of an Asynchronous Transfer Mode Interface Unit (ATMU) between a SONET/ATM link connected to a Common Broadband Platform and a Network Control and Timing (NCT) link connected to a digital access switch. The NCT link, in turn communicates with other PCM facilities, e.g., DSO facilities, DS1 facilities, through the time slot interchange facility of a connected access switch. In this prior art arrangement, communication between ATM cells and synchronous PCM channels requires double conversion of format in both directions of communication and introduces concomitant transmission delays.

DISCLOSURE OF THE INVENTION

In accordance with the present invention, our improved digital switch composes and decomposes ATM cells in an enhanced time slot interchange facility. Upon exchange of connection control signals between pairs of switches, a set of locations in a time slot interchange memory is "temporarily" assigned to the bytes of the payload of each active composite ATM cell. Such memory assignments are changed with the activation and release of ATM cells from call connection service. This activity corresponds to the installation and removal of a multi-channel facility, e.g., a T1 carrier facility between offices of the PSTN. The assignment of the payload bytes to call connections corresponds to the assignment of synchronous channel facilities to call connections.

Further, in accordance with the present invention, our improved switch, as an added feature, provides for switched communication between ATM cells and synchronous PCM signal channels; and between cells of different ATM facilities.

Advantageously, in accordance with our invention, our improved switch may serve in any end point of communication of a network. For example, our improved switch may be used as: a switch module of a 5ESS® community, a PBX, a stand alone local switch, and as a network access switch.

Advantageously, in accordance with our invention, ATM cells are economically processed with minimum hardware and, importantly, minimum transmission time delay.

THE DRAWING

PRIOR ART

FIGS. 1 through 7 relate to prior art arrangements which are disclosed in U.S. Pat. No. 5,345,446; and FIG. 8 is a schematic diagram of an illustrative improved time slot interchange facility which composes and decomposes composite ATM cells which serve voice and or data connections in accordance with our present invention.

Figure 1:
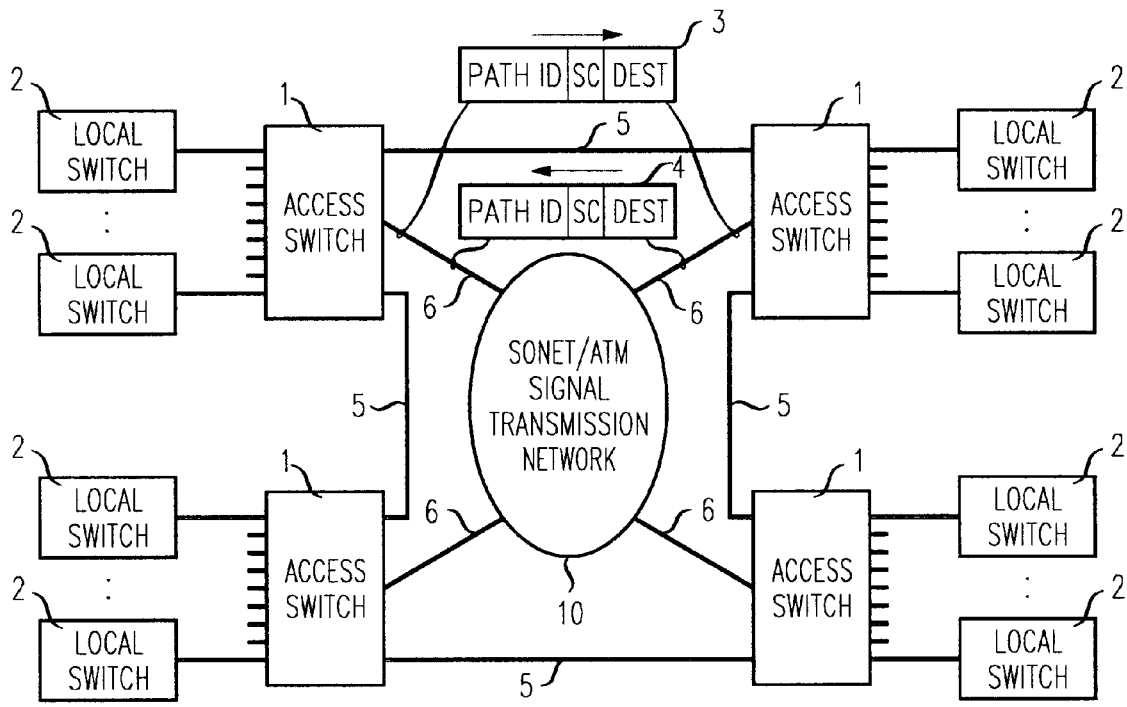
FIG. 1 illustrates a possible prior art network configuration for handling ATM signals.
Figure 2:
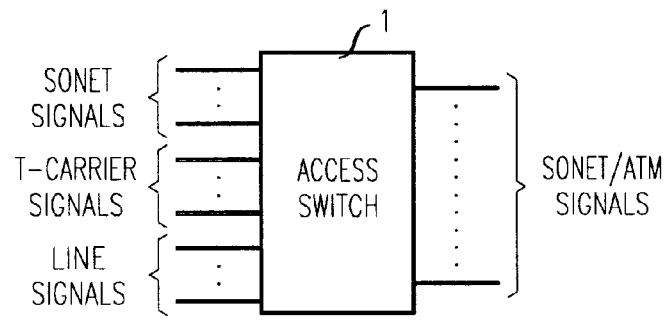
FIG. 2 illustrates types of signals served by prior art access switches of FIG. 1.

In FIG. 1, a communication network comprises a plurality of Access Switches 1 which serve their associated Local Switches 2. As seen in FIG. 2, the prior art Access Switch 1 communicates with a Local Switch 2 by SONET SIGNALS, T-Carrier signals, and line signals; and communicates with Signal Transmission Network 10 by SONET/ATM signals over paths 6. Additionally there is direct communication between access switches 1 over SONET/ATM links 5. In FIG. 1, messages 3 and 4 illustrate the exchange of setup and acknowledgement data between a pair of ATMU's 540 (see FIG. 4) which are associated with Access Switches 1. Message 3, from an ATMU of an originating Access Switch, carries the identity of the source and destination parties, and the identification of the PVC to be used in the call; and Message 4 is an acknowledgement message from the destination switch to the source switch confirming the identity of the path.

Figure 3:
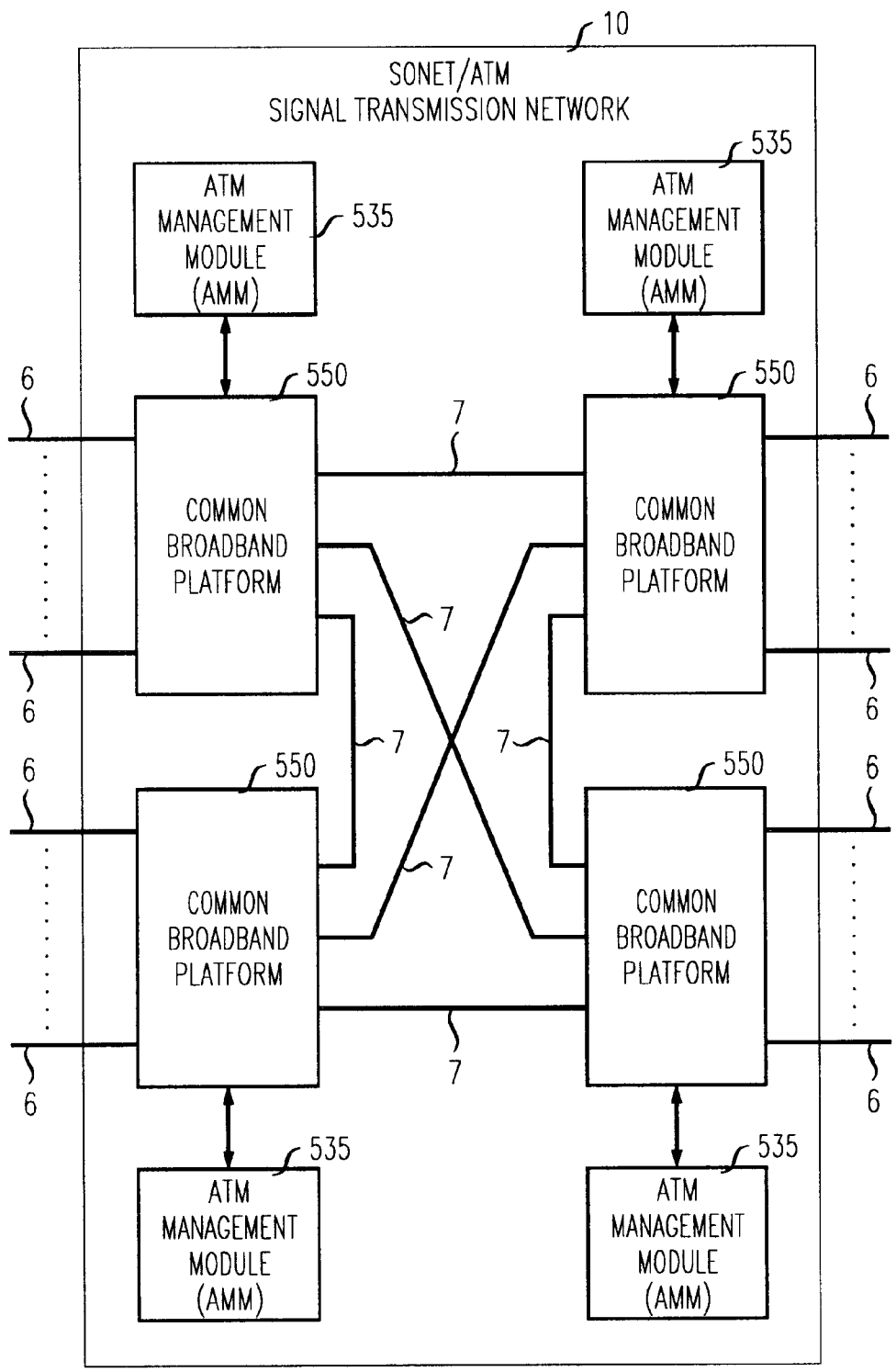
FIG. 3 illustrates a prior art SONET/ATM signal transmission network of FIG. 1.
Figure 4:
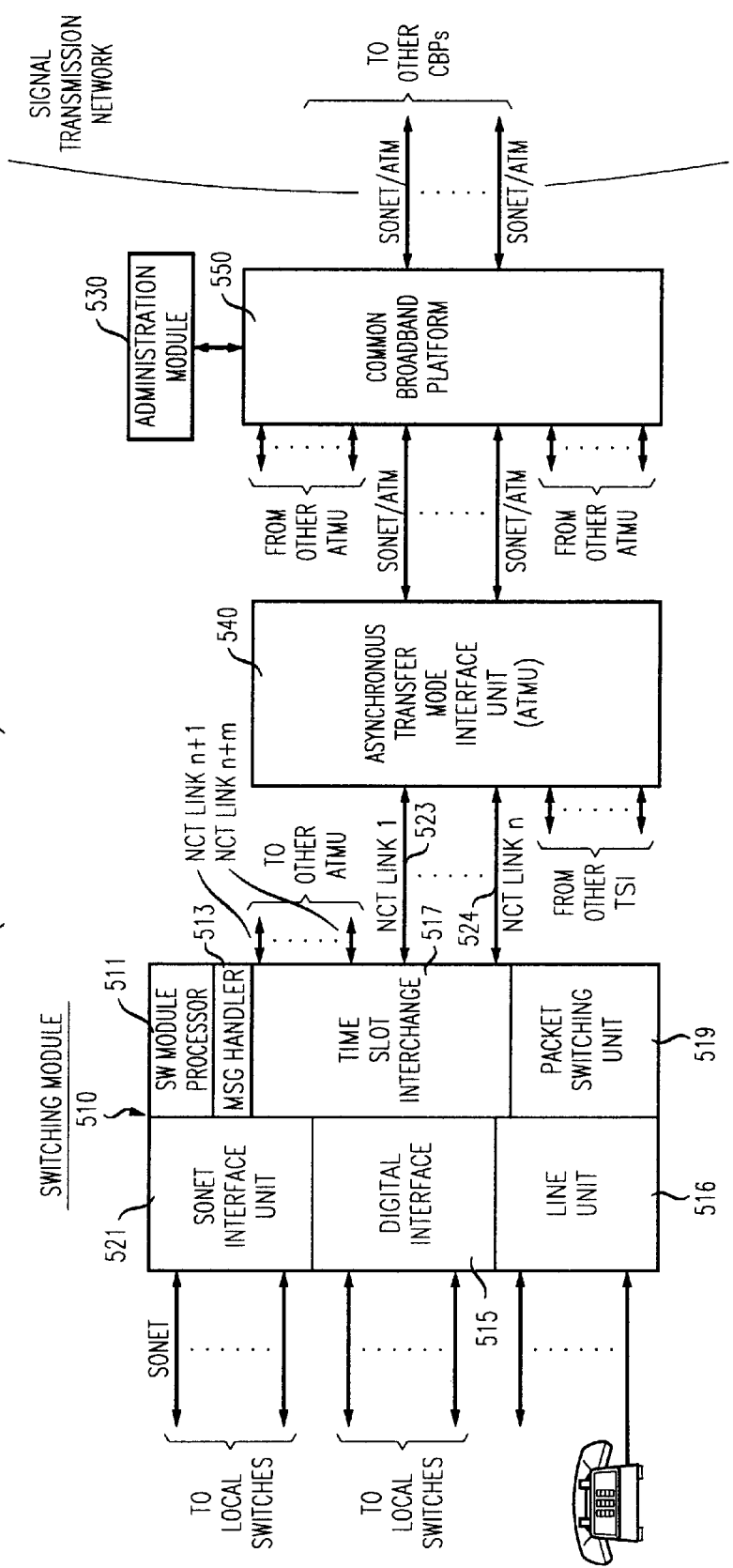
FIG. 4 shows the placement of an ATMU in the prior art.
Figure 5:
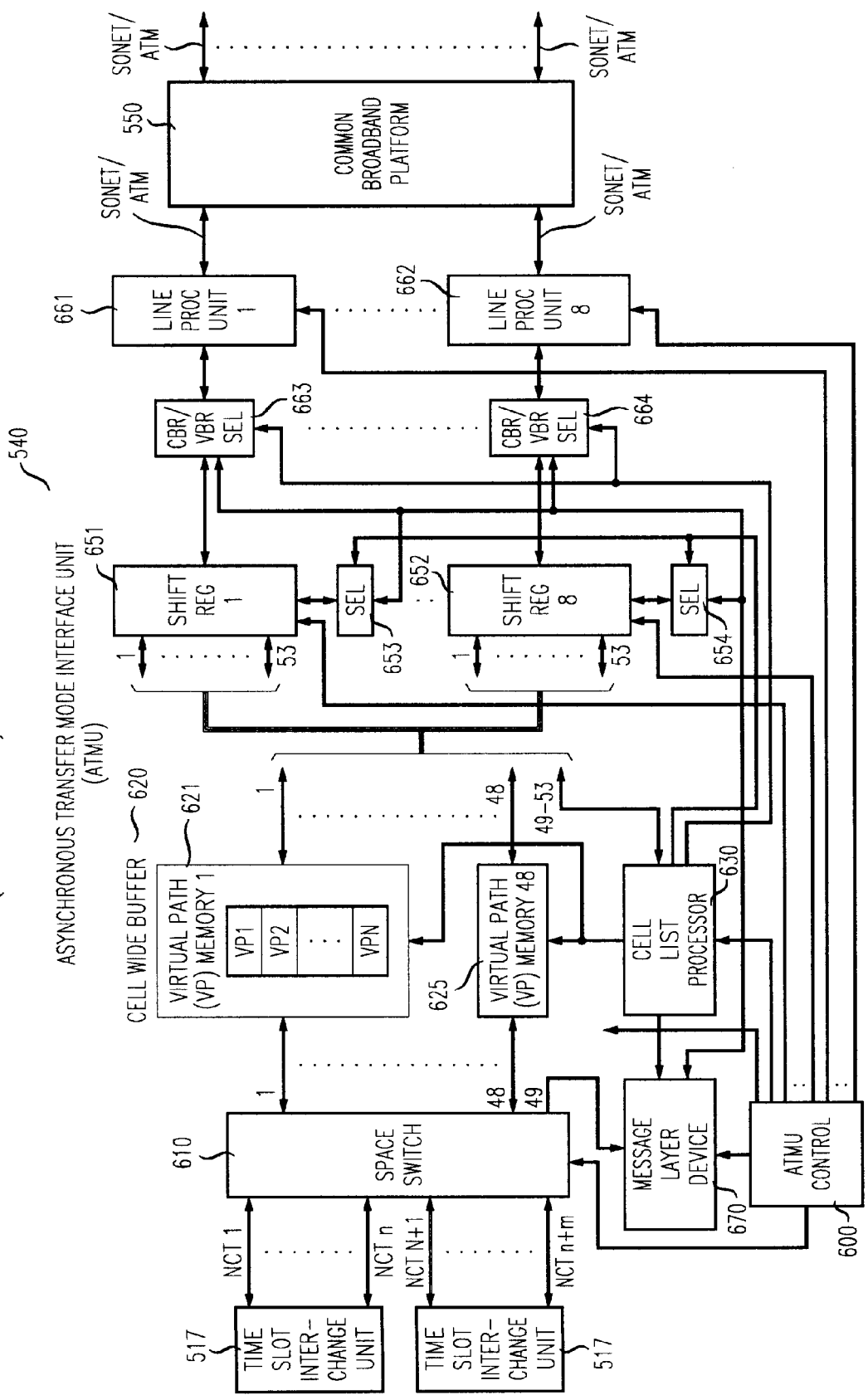
FIG. 5 is a schematic representation of a prior art ATMU.

FIG. 3 is a schematic block diagram of the Transmission Network 10 of FIG. 1. FIG. 4 illustrates the placement of ATMU 540 between an access switch 10 and a Common Broadband switch 550 of Transmission Network 10 of FIG. 1; and FIG. 5 illustrates a schematic block diagram of the ATMU of FIG. 4. In the ATMU of FIG. 5, NCT signals from the Time Slot Interchange Unit of Access Switch 517 are converted to cells of ATM signals which are transmitted as SONET/ATM signals at the output of Line Proc Units 661, 662.

Figure 6:
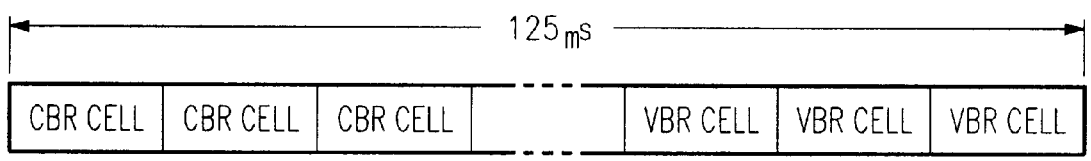
FIG. 6 illustrates the makeup of a prior art ATM frame.
Figure 7:
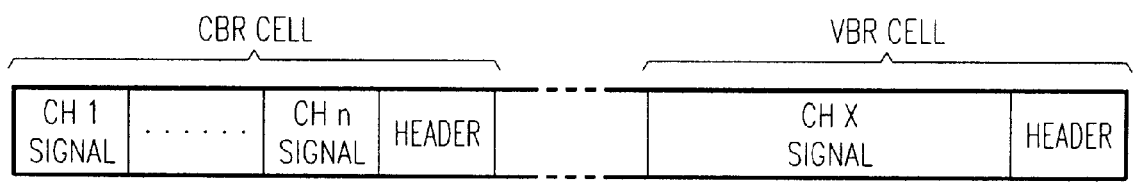
FIG. 7 illustrates the cells assigned to Constant Bit Rate (CBR)and Variable Bit Rate (VBR) transmissions.
Figure 8:
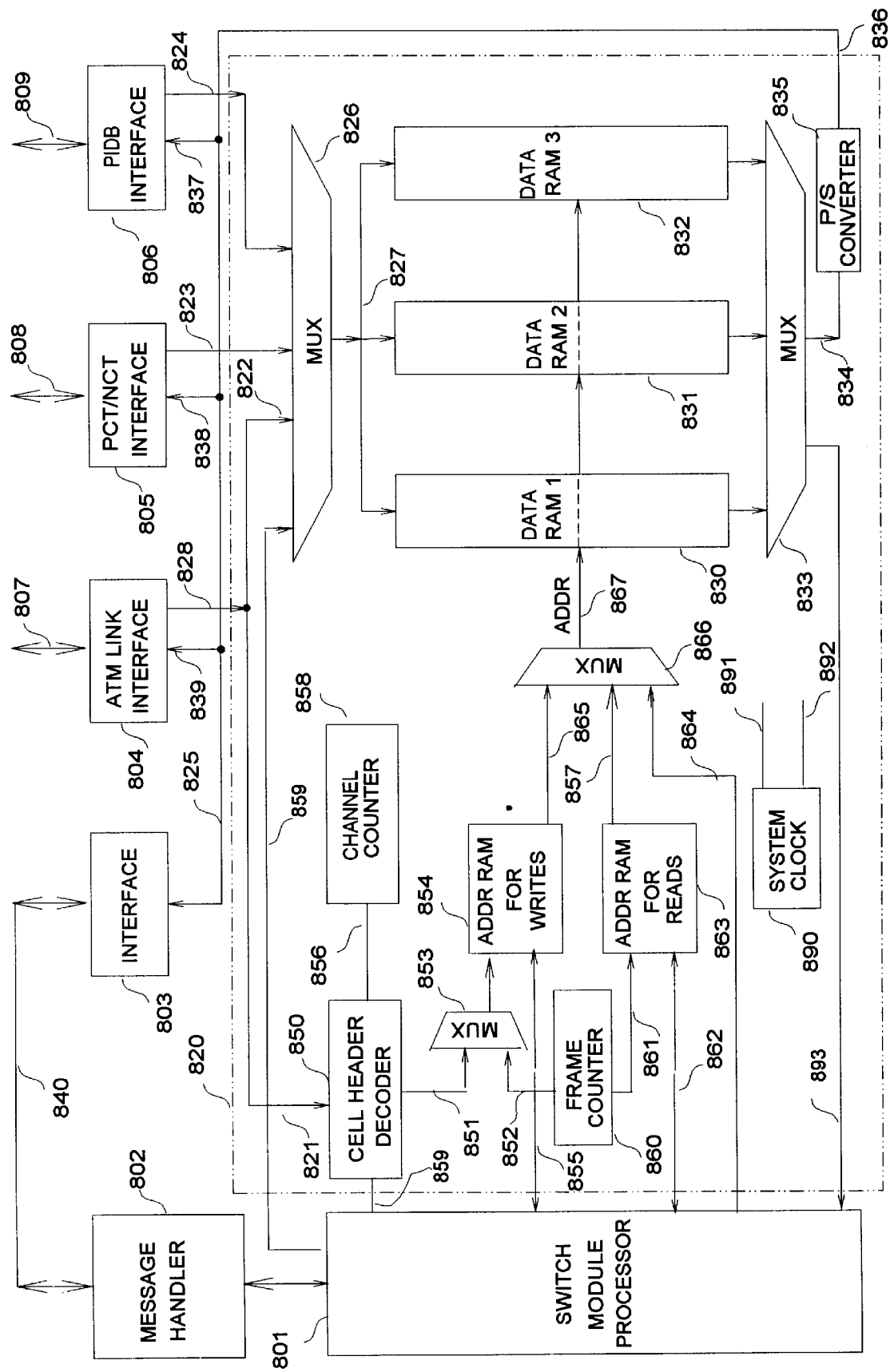
FIG. 8 illustrates an improved digital switch in accordance with the present invention.

FIG. 6 is an illustrative example of a variety of cell contents in one frame of an ATM signal; and FIG. 7 illustrates the makeup of a CBR cell and a VBR cell in the illustrative frame of FIG. 6.

THE PRESENT INVENTION

For purposes of explanation of the present invention, FIG. 8 illustrates a digital endpoint switch arranged to compose and decompose composite cells of ATM or ATM-like channels for the purpose of providing direct communication between: ATM facilities and synchronous channel facilities; and between ATM facilities served by the switch.

By way of example only, the switch of FIG. 8 may be a 5ESS® switch module which is modified in accordance with our present invention. The 5ESS switch family has been manufactured by AT&T and is described in *AT&T Technical Journal*, Vol 64, No. 6, Part 2, July–August 1985, pages 1305–1564. A 5ESS switch module comprises a Switch Module Processor (SMP) 801; a Message Handler (MH) 802; a time slot interchange (TSI) 820; and a plurality of synchronous channel interfaces, including PCT/NCT interface 805 to channels 808 and PIDB interface 806 to peripheral channels 809. Although not shown in FIG. 8, other synchronous channel facilities, e.g., T1 facilities are served by TSI 820 via their respective interface circuits. ATM link interface 804 is added by the present invention to provide communication with ATM channels 807. Control interface 803 provides communication between Message Handler 802 and interfaces 804, 805, and 806. Synchronous interface circuits, e.g., 805, 806 provide for serial to parallel conversion on incoming messages; and parallel to serial conversion is provided by converter 835 for outgoing signals to, e.g., channels 808, 809. In each case of the synchronous channels, the round trip transmission delay on those channels in a multiple of the frame period, i.e., a multiple of 125μ seconds. Each interface 804 through 809 may represent many interfaces of their respective type.

Although the synchronous channel facilities served by the switch of FIG. 8 have different data rates, they share a common frame period of 125μ seconds. By way of example, a DSO channel is a 64 kilobit PCM single channel signal; a DS1 signal is composed of 24 DSO signals; an NCT signal comprises 512 time slots of 64 kilobits/time slot; and a PIDB channel comprises 32 time slots of 64 kilobits/ time slot. For any given type of synchronous signal, e.g., DS1 type, each time slot has an invariant position in a frame relative to the other slots. The same is not true for the cells of ATM channels which arrive on link 807. While an ATM facility runs under a clock fixed for that particular ATM facility; the actual positions of the cells within a 125μ second time frame are not fixed and it is possible that more than one cell with the same header may arrive in one frame, and that no such cells may arrive in the next frame. Furthermore, there are no discrete framing signals on an ATM facility. Our improved TSI 820 provides for switched communication between ATM cells and synchronous PCM signal channels; between cells of different ATM facilities; and among ATM cells. In providing these services, our improved TSI compensates between the synchronous fixed timing demands of synchronous channel facilities and ATM facilities supported by this invention.

Since each byte of a cell payload represents a sample of a call in progress, the assignment of bytes to call connections dynamically follows the origination and termination of call connections.

In the prior art, selective communication between and among time slots of the various synchronous channel facilities is carried out through operation of Time Slot Interchange (TSI) 820. In the example of a 5ESS switch, the TSI operates with in excess of 30,000 time slots with each time slot divided into "memory write" and "memory read" periods. In the case of synchronous channels, sets of contiguous locations in memory are assigned to the time slots of signal channels, at the time that a synchronous channel facility, e.g., PCT channel facility 808, is put in service. Time Slot Interchange 820, under control of 801 and Message Handler 802 provides communication of PCM samples between synchronous channel facilities of the same or different bandwidth.

The exchange of call setup information between access switches is essential to the origination and termination of inter-switch communication; however, the manner of exchange is not essential to an understanding of the present invention. In the prior art, inter-office connections are established by exchange of formatted control messages between the nodes of an SS7 signalling network; and intra switch calls are constructed from signalling received from an originating party. In the illustrative example of the present invention, call origination and termination information is assumed to be exchanged in the normal course of business over the SS7 network; and at any given moment, Switch Module Processor 801 of FIG. 8 has complete records of the calls in progress through the switch.

As in the prior art, incoming PCM voice or data samples are written linearly into their respective permanently assigned memory locations during their assigned time slots as the samples arrive; and the stored samples are selectively read out during the time slots assigned to the respective parties to the served connections. Thus, in the case of two parties to a connection, a speech sample of the first party is stored in memory during a time slot assigned to that party; and the stored sample is selectively read out during the time slot assigned to the second party. The reverse is true of samples originating with the second party.

In the prior art, the memory of TSI 820 comprises two data RAMs, e.g., DATA RAM 830 and DATA RAM 831. The number of memory locations in each ram corresponding in number to the number of time slots in a switch frame period of time. During one frame period, i.e., during a first 125μ second frame, data samples are stored in DATA RAM 830, and during that frame data samples are selectively read from DATA RAM 831. During the following frame, the roles of the RAMs 830 and 831 are reversed.

In accordance with the present invention, composition and decomposition of ATM cells is added to the functionality of Time Slot Interchange 820 of FIG. 8.

As seen in FIG. 8, a third data ram 832 has been added to the prior art switch to accommodate for possible "jitter" in the time of arrival of samples on the ATM link 807. The possible variation in time of arrival of PCM samples is due to a statistical distribution in the delay of packets in transmission through an interconnecting ATM network. Such variation in delay, which through simulation has been found to be less than a 125μ frame period, may happen from frame to frame. Thus it is possible that two samples for an ATM channel facility may be received in a single TSI frame period, and that in other frames it is possible that there will be no sample for the same channel facility. In the absence of the third data ram, the first or the second sample of the frame would be lost, and in the case of cells which contain data, as opposed to analog signals, such loss of data would be intolerable. The third data ram is only required in the case of decomposition of received ATM signals and not in the composition of such signals. In the memory arrangement of FIG. 8, data in successive frames, by way of example, is written in sequence in RAMs 831, 832, and 830; and respectively read from RAMs 830, 831, and 832 in those frames.

In accordance with the present invention, Message Handler 802 and Switch Module Processor 801 dynamically assign a set of memory locations in a TSI Ram to the bytes of each ATM cell; and those assignments are coordinated with the data header of those cells. The bytes of the cell payload are individually assigned to call connections through the switch. Cell header decoder 850 is thus capable of directing the writing of the bytes of an incoming cell to the correct memory locations in each frame; and Switch Module Processor (SMP) 801 directs selective reading of data from the RAMs 830, 831, 832 to effect the required communication paths. For example, if an incoming cell comprises a payload of 48 bytes, decoding of the header data defines which 48 memory locations in a defined one of the RAMs 830, 831, and 832 are to be temporarily used for the received samples. Additionally, Message Handler 802 and SMP 801 utilize the memory assignment information to selectively read the samples in the assigned memory locations during the time slots assigned to the receiving parties of the connections. ATM cells are decomposed by selectively writing the payload data bytes of a cell into temporally assigned memory locations during available time slots of TSI 820; and that data are selectively read during the time slots of the receiving parties.

Cell Header and call data destined for inclusion in an outgoing cell of an ATM line are selectively read from memory 830, 831, 832 during the time slots corresponding to the memory locations temporarily assigned to the outgoing cell under control of Switch Module Processor 801. Thus, ATM cells are composed through operation of Time Slot Interchange 820.

Writing data into and reading data from DATA RAMs 830, 831, 832 is under control of address data in address ram 854 for writing; and is under control of address data in address ram 863 for reads.

Addresses for linearly writing samples from synchronous data facilities, e.g., PCT/NCT facilities 808, are generated by FRAME COUNTER 860. Such addresses define the currently used one of the RAMs 830, 831, 832 and the memory locations assigned to the synchronous channel facilities being served. Output signals of FRAME COUNTER 860 are provided to ram 854 over path 852 and MUX 853.

Addresses for directed reading of data samples are formed by output signals of FRAME COUNTER 860 which defines the currently used one of the RAMs 830, 831, and 832; and specific memory location address data is provided by Switch Module Processor 801 over path 862.

In accordance with the present invention, it is possible to exchange voice and data between ATM lines by temporarily assigning sets of time slots to the headers and payloads of cells of each line; selectively writing data from each cell into memory to decompose such cells; and subsequently selectively reading the stored data from those memory locations during time slots assigned to a cell of an other link to compose an outgoing payload. A cell header for each outgoing cell may be derived from a header designation stored along with the cell payload data.

In FIG. 8, ATM link Interface 804 communicates ATM signals from link 807 to Cell Header Decoder 850 over the path 828, 821; and communicates such signals to MUX 826 over paths 828, 822. By way of example, the output of decoder 850 on path 851 defines one of the RAMs 830, 831, 832; provides an index value for locating a set of memory locations for writing the bytes of the payload of an incoming ATM cell; and Channel Counter 858 on path 856 serves to advance writing of payload bytes through the assigned memory locations.

In addition to provision of Cell Header Decoder 850, selective writing of the ATM cell payload data is accomplished by the addition of path 851, MUX 853, Address Ram for Writes 854, Channel Counter 858, path 856, path 855 for communication of address data between Switch Module Processor 801 and Address Ram 854, and path 865.

Cell Header Decoder 850 may be considered to be a table lookup data base comprising a plurality of data records corresponding in number to the maximum number of composite ATM cells which can be assigned to call connection service. Each data record comprises: a cell header value, a memory offset value and a modulo three counter. In concept, each such record defines a virtual 48 channel facility.

At the time that an ATM cell is committed to call connection service, SMP 801, over path 859, seizes an idle record in decoder 850, writes cell header and memory address offset values into the seized record; causes the value of its counter to be set to correspond to the identity of the one of the RAMs 830, 831, 832 next to be read, and, over path 859, writes the cell header bytes into identical address locations assigned to the current record of Decoder 850 in RAMs 830, 831, and 832. ATM cell headers and corresponding payload data are buffered in ATM Link Interface 804 as they arrive; and Cell headers are sent to decoder 850 during idle time slots. Thereafter, under control of counts received from Channel Counter 858 over path 856, the 48 bytes of the payload of the identified cell are written into the ram 830, 831, 832 identified by the current value in the modulo three counter of the current decoder record. SMP 801, over path 893, verifies that the cell header data has been entered in the RAMs. As each cell header value is received by decoder 850, the corresponding modulo three counter is incremented by one in preparation for the next receipt of that cell header value. Accordingly, the payload of each cell header is written into the correct one of RAMs 830, 831, 832 independently of the 125μ second time period in which the cell arrives.

Although connections from System Clock 890 to elements of FIG. 8 are not specifically shown in the drawing, it is understood that operations within FIG. 8 are synchronized to the system clock.

The invention has been described with particular attention to its preferred embodiment; however, it should be understood that variations and modifications within the spirit and scope of the invention may occur to those skilled in the art to which the invention pertains.

What is claimed is:

1. A communication switch comprising:
   data signal input-output port means (807, 808, 809) for transmitting and receiving data signals corresponding to channels of communication;

time slot interchange (820) comprising:
   means (890, 857) for generating signals defining switch frame periods of time, and time slot periods within said frame periods;
   a memory comprising first and second time slot memories (830, 831), each said time slot memory comprising a plurality of addressable memory locations corresponding in number to the number of time slot periods in a switch frame period of time and individually assigned to said time slot periods;
   control means (801, 802) for selectively controlling said time slot interchange means to exchange data signals between said input-output port means and said time slot memories to selectively establish communication between said channels of communication served by the switch;
   characterized in that
   one said signal input-output port means (807) comprises means for transmitting and receiving asynchronous signals comprising independent cells of data comprising a discrete cell header and a multi byte payload assigned to established channels of communication; and
   said control means (801, 802) comprises: means for assigning time slots of a switch frame period to the bytes of each cell; and cell header decoding means for generating signals for coordinating writing of payload data in said assigned time slots.

2. A communication switch in accordance with claim 1 wherein:
   others of said signal input-output port means (808, 809) comprise means for transmitting and receiving synchronous data signals corresponding to channels of communication occurring in fixed frame periods of time.

3. A communication switch in accordance with claim 1 wherein:
   said memory further comprises a third time slot memory comprising another plurality of addressable memory locations corresponding in number to the number of time slot periods in each switch frame period of time and individually assigned to said time slot periods;
   said control means (801, 802), in successive switch frame periods of times, writes data into said second, third, and first memories in succession and reads data from said first, second, and third memories in succession during said successive switch frame periods;
   said control means comprises: means for detecting receipt of two cells with identical headers during a single switch frame period at said one input-output port means (807); and
   means for writing the payload data of the later arriving cell in the time slot memory following the memory in use in said single frame period.

4. A communication switch in accordance with claim 2 wherein:
   said control means (801, 802) selectively establishes communication among and between the channels of communication represented by said asynchronous and said synchronous data signals.

5. A communication switch in accordance with claim 1 wherein:
   said asynchronous signals comprise ATM signals.

6. A communication switch comprising:
   at least one synchronous signal input-output port means (808, 809) for transmitting and receiving data signals corresponding to channels of communication occurring in fixed time period frames;
   means (890, 857) for generating signals defining switch frame periods of time, and time slot periods within said frame periods;
   time slot interchange (820) comprising:
      first, second, and third time slot memories (830, 831, 832), each memory comprising a plurality of addressable memory locations corresponding in number to the number of time slots in each switch frame period of time and individually assigned to said time slots;
      control means (801, 802) for controlling said time slot interchange means to exchange data signals between said synchronous input-output port means and said time slot memories to establish communication with said synchronous channels of communication
      said communication switch further comprises:
         at least one asynchronous signal input-output port means (807) for transmitting and receiving signals comprising independent cells of data comprising a cell header and a multi byte payload representing data of channels of communication;
         said control means (801, 802) comprises means for temporarily assigning free time slots of a frame period to the bytes of each cell payload; decoding means for interpreting received cell headers and means responsive to said decoding means for controlling said time slot memories to establish communication between channels of communication served by the switch.

7. A communication switch comprising:
   at least one synchronous signal input-output port means (808, 809) for transmitting and receiving data signals corresponding to channels of communication;
   at least one asynchronous signal input-output port means (807) for transmitting and receiving signals comprising independent cells of data; each cell comprising a cell header and a multi byte payload representing channels of communication;
   means (890, 857) for generating signals defining switch frame periods of time, time slot periods within said frame periods;
   time slot interchange (820) comprising:
      first, second, and third time slot memories (830, 831, 832), each memory comprising a plurality of addressable memory locations corresponding in number to the number of time slots in each switch frame period of time and individually assigned to said time slots;
      control means (801, 802) for controlling said time slot interchange means to exchange data signals between said synchronous input-output port means and said time slot memories;
      said control means (801, 802) fuller comprises means for temporarily assigning free time slots of a frame period to the bytes of each cell payload; decoding means for interpreting received cell headers and means responsive to said decoding means for controlling said time slot memories to establish communication between channels of communication served by said switch and
      said control means comprises: means for detecting receipt of two cells with identical headers during a single switch frame period at said asynchronous signal input-output port means (807); and
      means for writing the payload data of the later arriving cell in the time slot memory following the memory in use in said single frame period.

8. A communication switch comprising:

at least one asynchronous input-output port means (807) for transmitting and receiving asynchronous signals comprising independent cells of data, each cell comprising a discrete cell header and a multi byte payload assigned to channels of communication;

time slot interchange (820) comprising:

- means (890, 857) for generating signals defining switch frame periods of time, and time slot periods within said frame periods;
- a memory comprising a plurality of addressable memory locations individually assigned to said time slot periods;
- control means (801, 802) for selectively controlling said time slot interchange means to exchange data signals between said asynchronous input-output port means (807) and said memory locations to electively establish communication between said channels of communication served by the switch; and
- said control means (801, 802) comprises: means for assigning time slots of a switch frame period to the bytes of each cell; and cell header decoding means for coordinating writing of payload data in said assigned time slots.

9. A communication switch in accordance with claim 8 wherein:

said memory means comprises first, second, and third time slot memories, said control means (801, 802), in successive switch frame periods of times, writes data into said second, third, and first memories in succession and reads data from said first, second, and third memories in succession during said successive switch frame periods;

said control means comprises: means for detecting receipt of two cells with identical headers during a single switch frame period at said one input-output port means (807); and means for writing the payload data of the later arriving cell in the time slot memory following the memory in use in said single frame period.

* * * * *

UNITED STATES PATENT AND TRADEMARK OFFICE
CERTIFICATE OF CORRECTION

PATENT NO.  : 5,953,330

DATED       : September 14, 1999

INVENTOR(S) : Ronald Jay Canniff, Thomas Lloyd Hiller, Ronald Anthony Spanke, John Joseph Stanaway, Jr., Alex Lawrence Wierzbicki, Meyer Zola It is certified that error appears in the above-identified patent and that said Letters Patent is hereby corrected as shown below:

Column 8, claim 7, line 53, delete "fuller" and insert --further--.

Column 9, claim 8, line 18, delete "electively" and insert --selectively--.

Signed and Sealed this

Twenty-fourth Day of October, 2000

Attest:

Q. TODD DICKINSON

Attesting Officer

Director of Patents and Trademarks